F. T. P. KNUPPEL.
FURROW CUTTING AND SCARIFYING MACHINE.
APPLICATION FILED SEPT. 18, 1919.
1,354,665.
Patented Oct. 5, 1920.
2 SHEETS—SHEET 1.
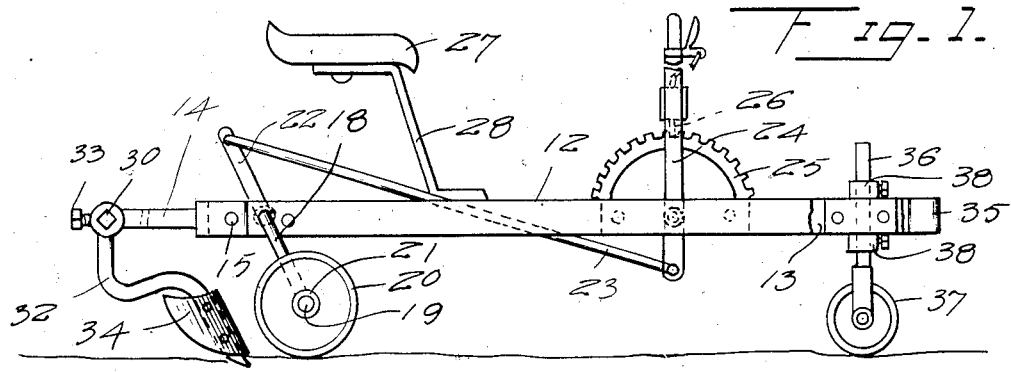
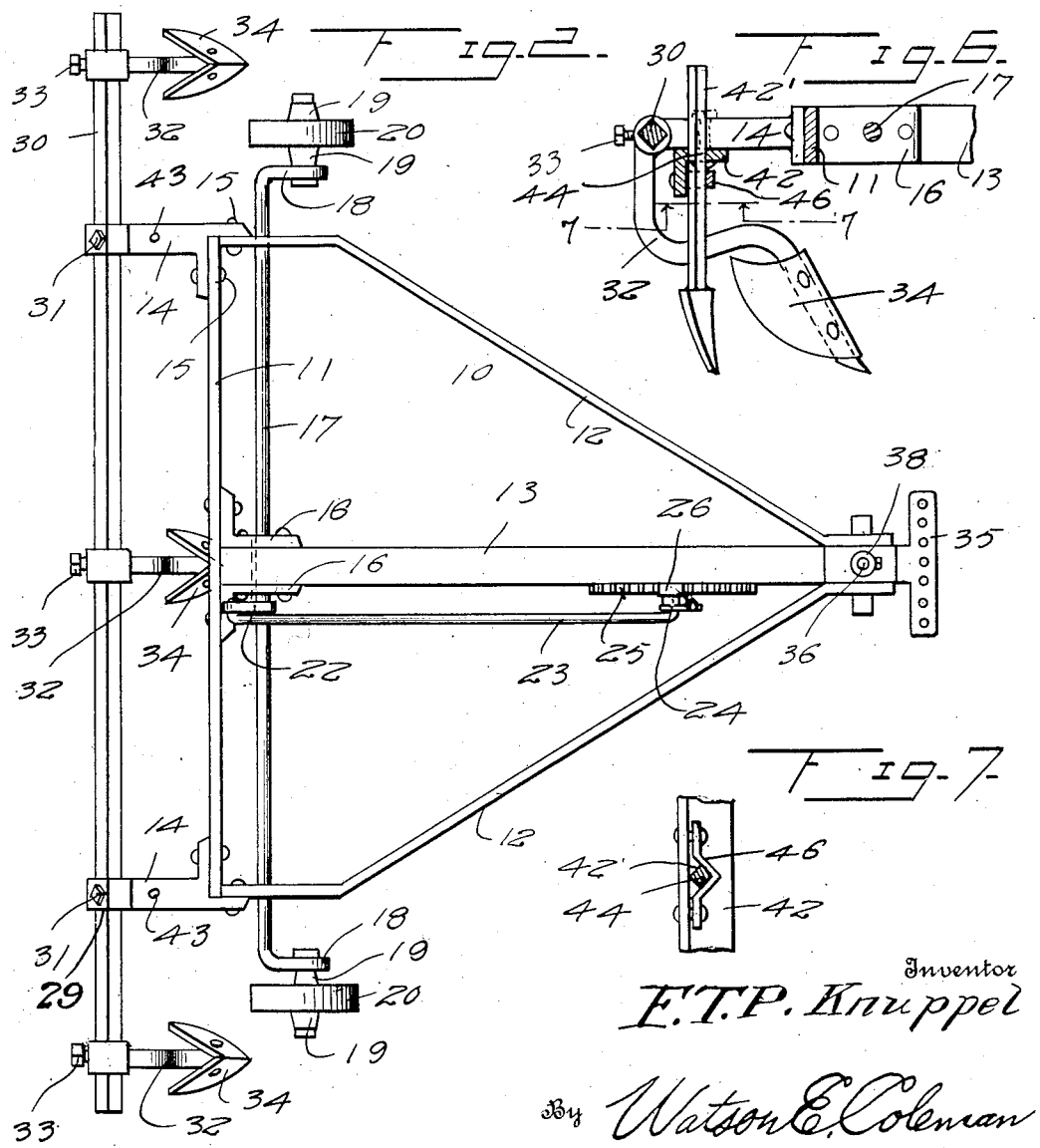
Inventor
F.T.P. Knuppel
By Watson E. Coleman
Attorney F. T. P. KNUPPEL.
FURROW CUTTING AND SCARIFYING MACHINE.
APPLICATION FILED SEPT. 18, 1919.
1,354,665.
Patented Oct. 5, 1920.
2 SHEETS—SHEET 2.
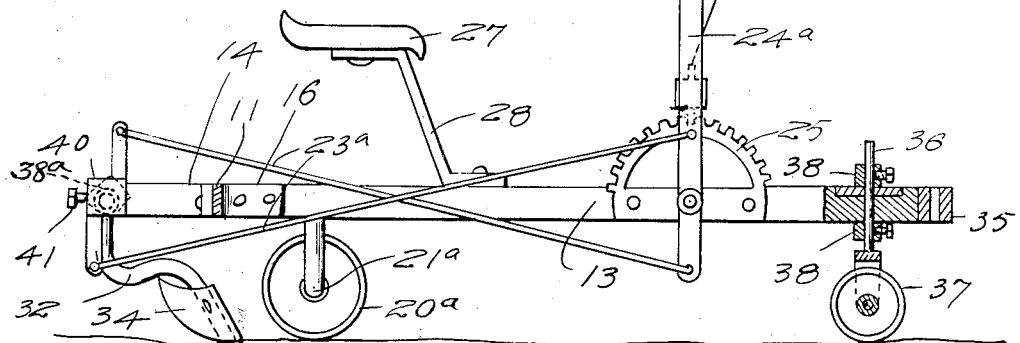
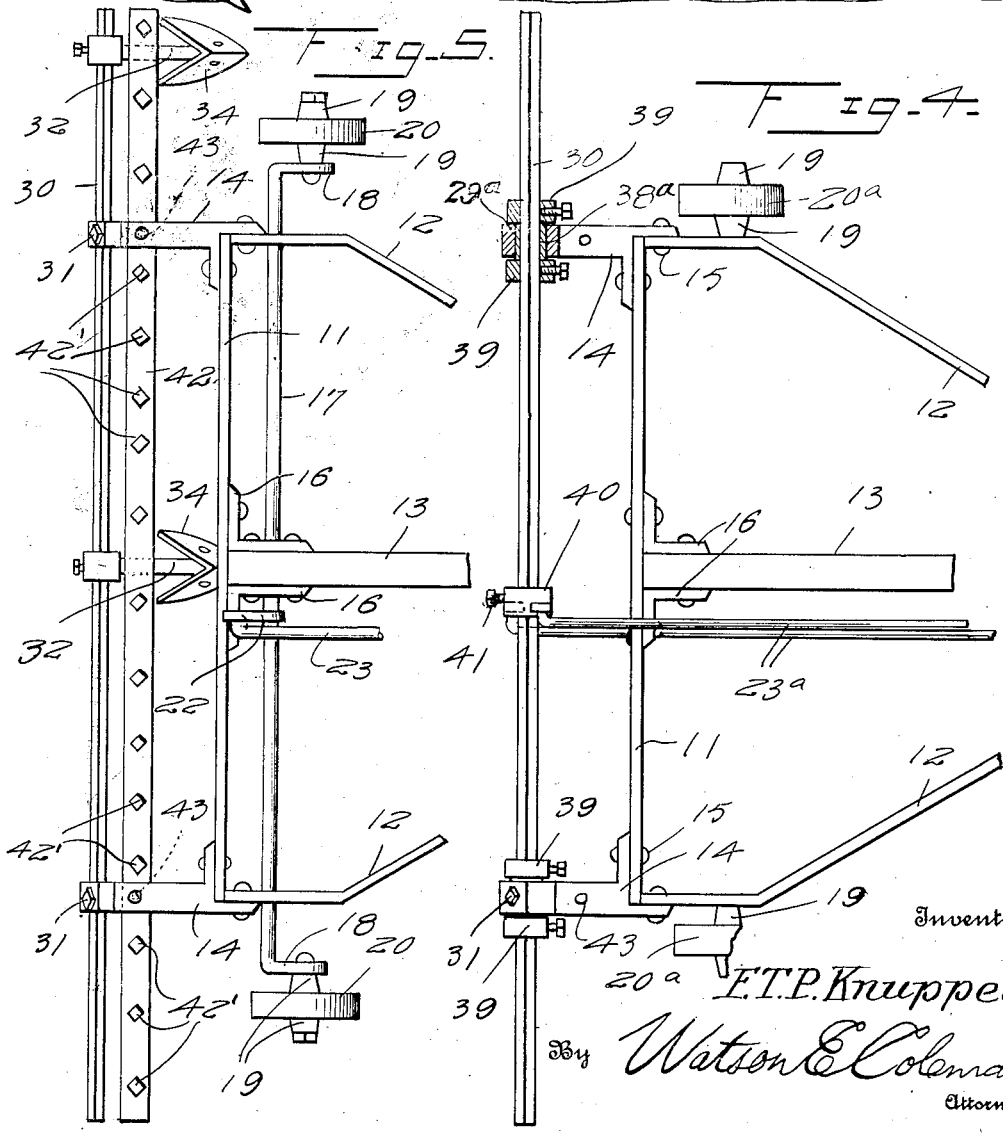
Inventor
F.T.P. Knuppel.
By Watson E. Coleman
Attorney

UNITED STATES PATENT OFFICE.

FRANK THEODOR PAUL KNUPPEL, OF KLINK, CALIFORNIA.

FURROW-CUTTING AND SCARIFYING MACHINE.

1,354,665.　　　　Specification of Letters Patent.　　Patented Oct. 5, 1920.

Application filed September 18, 1919. Serial No. 324,386.

*To all whom it may concern:*

Be it known that I, FRANK THEODOR PAUL KNUPPEL, a citizen of the United States, residing at Klink, in the county of Tulare and State of California, have invented certain new and useful Improvements in Furrow-Cutting and Scarifying Machines, of which the following is a specification, reference being had to the accompanying drawings.

This invention relates to agricultural machines, and particularly to means for furrowing, scarifying or cultivating the ground.

The general object of my invention is to provide a very simple mechanism to this end particularly adapted to making furrows in orchards such as orange, lemon, fig, peach, olive, or in vineyards, the furrows to be made between and around the trees.

A further object of the invention is to provide a mechanism of this character which can be used either with horses or a tractor and which is so low that the furrows may be made close to the trees without injuring or breaking off the branches.

A further object is to provide a construction of this character in which the depth of cut may regulated and in which the distance between the furrows may be regulated.

A further object is to provide a machine of this character which may be used for forming small irrigating ditches or furrows and which may be afterward changed to break up the irrigating furrows previously formed and cultivate the ground so as to hold the moisture.

Other objects will appear in the course of the following description.

My invention is illustrated in the accompanying drawings, wherein:—

Figure 1 is a side elevation of the preferred embodiment of my invention;

Fig. 2 is a top plan view;

Fig. 3 is a side elevation and sectional view of a modified form of my invention;

Fig. 4 is a fragmentary top plan view of the modified form showing the mounting of the bar;

Fig. 5 is a fragmentary top plan view of the preferred embodiment of my invention showing the scarifying attachment applied;

Fig. 6 is a side elevation and sectional view of the scarifying attachment and its connection to the machine;

Fig. 7 is a detail view of the clamp for holding the teeth of the scarifying attachment.

Referring particularly to Figs. 1 and 2, 10 designates an approximately triangular frame formed of a transverse piece 11 and two converging irons 12 which are bolted at their forward ends to a longitudinally extending timber 13. The rearward ends of the irons 12 are bent so as to extend longitudinally and are held in right angular relation to the cross piece 11 by means of the hangers 14 which are formed with angularly disposed flanges at their bases, bolted, riveted or otherwise connected to the irons 11 and 12 by the bolts 15. The timber 13 is connected to the cross piece 11 by the angle irons 16 which are bolted to the piece 11 and to the timber 13. Extending through the timber 13, the irons 16, and through the rear ends of the frame members 12, is an axle 17 which is held from longitudinal movement in its bearings in any suitable manner, the ends of this axle being cranked, as at 18, and provided with stub shafts 19 carrying the supporting wheels 20. These supporting wheels are preferably protected by dust caps 21. The axle 17 has extending from it a radial arm 22 and from this arm a connection 23 extends to the lower end of a vertical lever 24 operating over an arcuate rack 25 and engaged in any suitable position on this rack by means of the bolt 26 operated by the usual hand grip. A seat 27 is supported by a seat supporting iron 28 bolted to the beam 13.

The hangers 14 at their rear ends are formed with square, transversely extending apertures 29, and passing through these apertures is a square bar 30, this rod or bar being held in place in the apertures by set screws 31. Mounted upon this transverse bar are a plurality of standards 32 having square apertures through which the bar passes and set screws 33 whereby the standards may be held in adjusted positions upon the bar, these standards extending downward and forward and are pointed at the extremity and mounted upon the standards and extending rearward therefrom on both sides are the shovels 34. It will be seen that these standards have steel points which extend beyond the shovels to do the digging and protect the points of the shovels.

It will be noted that by removing the shovels from the bar, and then removing the bar from the hangers or brackets 14, that the bar may be rotated and reinserted in place, or the shovels positioned differently upon the bar so as to change the angle of the standards 32 with relation to the ground and thus change the angle of the shovels with relation to the ground. It will also be obvious that any number of standards may be disposed upon this bar, and that these standards may be disposed in any desired relation to each other so that furrows may be made close together or farther apart, as desired.

Any desired draft appliance may be mounted upon the forward end of the beam 13, but I have shown for this purpose a draw bar 35 disposed vertically and having a plurality of apertures for the usual draft clevis. Either a tractor or draft animals may be used for drawing this cultivator or furrower, and preferably the forward end of the beam 13 is formed with a vertical aperture through which passes the spindle 36 of a caster wheel 37 held in place by collars 38. This will support the forward end of the frame where draft animals are being used. The collars are adjustable by means of set screws on the spindle so as to depress the wheel or raise it in accordance with the adjustment of the wheels 20 by means of the crankshaft 17. Where the forward end of the frame is attached to a tractor, however, this wheel 27 and its support is not needed.

In Fig. 3 I show a slight modification of the construction previously illustrated. In this case the general frame is the same as heretofore described, but no transverse shaft 17 is used, the wheels 20ª being mounted upon stub shafts 21ª extending directly from the frame beams 12. In order to adjust the cultivator plows, shovels or other tools, I mount the cross bar 30ª, which is square in cross section, in sleeves 38ª which have a square bore passing through them from end to end to receive the square shaft but whose periphery is rounded so as to fit within the round openings 29ª in the brackets 14. Collars 39 are used on each side of the bearing to hold it in place and prevent any tendency of the cross bar 30 to shift. Mounted upon the middle of the cross bar 30 is a beveled armed lever 40 having one arm extending upward and the other downward and held in position by a set screw 41. The lever 24ª extends below its fulcrum, and connections 23ª extend from the arms of the lever 40, one to a point below the fulcrum and the other to a point above the fulcrum so that as the lever 24 is shifted in one direction or the other, the transverse shovel-supporting bar 30 will be rocked to a greater or less extent to thus depress the shovels or other cultivating implements to a greater or less extent. The same shovels or other cultivating implements are used upon the bar 30 as was previously described. Save for the changes above referred to, the mechanism is precisely the same as illustrated in Fig. 1.

In Figs. 5 and 6 I show how the machine shown in Fig. 1 can be slightly changed by the application of an attachment thereto so as to scarify the ground after the furrows have been made. To this end I provide an angle iron 42 which is adapted to be bolted by bolts 43 to the brackets 14, this angle iron being provided in one flange with a series of square openings 44 through which the shanks of the teeth 42' may be inserted. Clamps 46 are disposed over the shanks of these teeth and are bolted against the vertical flange of the angle iron 42. The teeth may be adjusted to extend downward any desired depth and any desired number of teeth may be placed upon the angle iron 42. This attachment is particularly adapted for cutting and breaking up the little irrigating ditches formed by the machine as first described and so cutting up the ground that it will hold moisture. This attachment works particularly well with "hard sand" as the steel points or teeth are rigidly mounted and scratch up the hard sand.

While I have illustrated a form of my invention which I have found to be thoroughly effective in practice and which is particularly adapted as applied and illustrated for the purpose of cultivating orchards, for forming irrigating ditches therein, etc., yet I do not wish to be limited to the construction illustrated, as it is obvious that many changes might be made in the form and arrangement of the parts without departing from the spirit of the invention.

I claim:—

1. A machine of the character described, comprising a supporting frame, hangers disposed at the rear corners of the frame for connecting the rear portions of the frame to the side portions thereof, said brackets having right angularly related lugs engaged on the sides and rear of the frame, and bracing said corners, a shaft supported by and movable through said hangers laterally of the frame, and ground working implements carried by the shaft.

2. A machine of the character described, comprising a supporting frame having front and rear wheels, hangers engaging the side and rear portions of the frame at the rear corners of said frame, said hangers projecting rearwardly of the frame in right angular relation to the rear portion of the frame; a shaft supported by said hangers, a collar detachably mounted on the shaft, arms projecting from said collar in the opposite direction to each other, a lever pivoted to said frame, and connecting rods connected at one of their ends to one of said arms, said rods crossing each other at their intermediate portions and having their other ends connected to the lever on both sides of the pivot thereof for oscillating and bracing said shaft, said shaft being movable through the collar.

In testimony whereof I hereunto affix my signature.

FRANK THEODOR PAUL KNUPPEL.